United States Patent [19]

Tsukamoto et al.

[11] Patent Number: 5,295,670
[45] Date of Patent: Mar. 22, 1994

[54] STEERING COUPLING STRUCTURE HAVING CYLINDRICAL BUSHING WITH HOLLOW PORTIONS

[75] Inventors: Yoshikazu Tsukamoto, Komaki; Shinji Miyakawa, Kasugai, both of Japan

[73] Assignee: Tokai Rubber Industries, Ltd., Japan

[21] Appl. No.: 882,565

[22] Filed: May 13, 1992
(Under 37 CFR 1.47)

[30] Foreign Application Priority Data

May 17, 1991 [JP] Japan ............... 3-142580

[51] Int. Cl.⁵ ............................................. F16M 1/00
[52] U.S. Cl. ................................ 267/140.5; 464/87; 464/160
[58] Field of Search ............ 267/140.5, 276, 277, 267/279, 281, 141.2; 464/51, 87, 160, 93; 180/79, 79.3; 403/79, 145, 161, 162, 163

[56] References Cited

U.S. PATENT DOCUMENTS

| | | | |
|---|---|---|---|
| 3,222,885 | 12/1965 | Hein | 464/71 |
| 3,311,364 | 3/1967 | de Castelet | 267/276 X |
| 3,467,421 | 9/1969 | Bentley | 267/279 X |
| 4,132,430 | 1/1979 | Bantle | 267/281 X |
| 4,530,514 | 7/1985 | Ito | 267/276 X |
| 4,834,416 | 5/1989 | Shimoe et al. | 267/281 X |
| 4,872,361 | 10/1989 | Muller | 464/87 X |

FOREIGN PATENT DOCUMENTS

| | | |
|---|---|---|
| 3243981 | 5/1984 | Fed. Rep. of Germany ...... 267/281 |
| 56-35539 | 8/1981 | Japan . |
| 59-29147 | 8/1984 | Japan . |
| 63-18837 | 3/1988 | Japan . |

*Primary Examiner*—Andres Kashnikow
*Assistant Examiner*—Kevin D. Rutherford
*Attorney, Agent, or Firm*—Parkhurst, Wendel & Rossi

[57] ABSTRACT

A steering coupling structure is disclosed which includes a cylindrical bushing mounted in a transmission line of a steering force in a steering system of a motor vehicle, such that an axis of the bushing extends in a direction substantially perpendicular to an axis of rotation of the steering system. The cylindrical bushing includes an inner sleeve connected to one of the input and output shafts of the steering system, an outer sleeve disposed radially outwardly of the inner sleeve and connected to the other shaft; and an annular elastic body interposed between the input and output sleeves for elastic connection thereof. The elastic body has diametrically opposed hollow portions formed on opposite sides of the inner sleeve such that the hollow portions extend in an axial direction of the bushing between the inner and outer sleeves, and such that the hollow portions are substantially opposed to each other in a diametric direction of the elastic body which is parallel to the axis of rotation of the steering system.

5 Claims, 2 Drawing Sheets

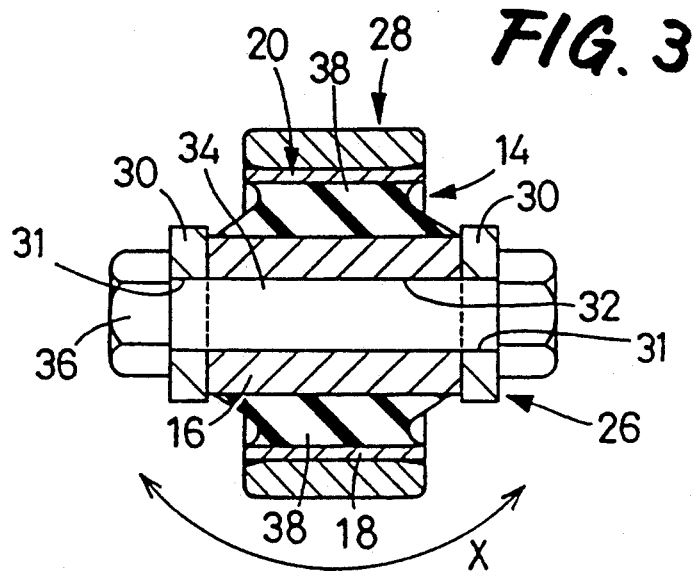
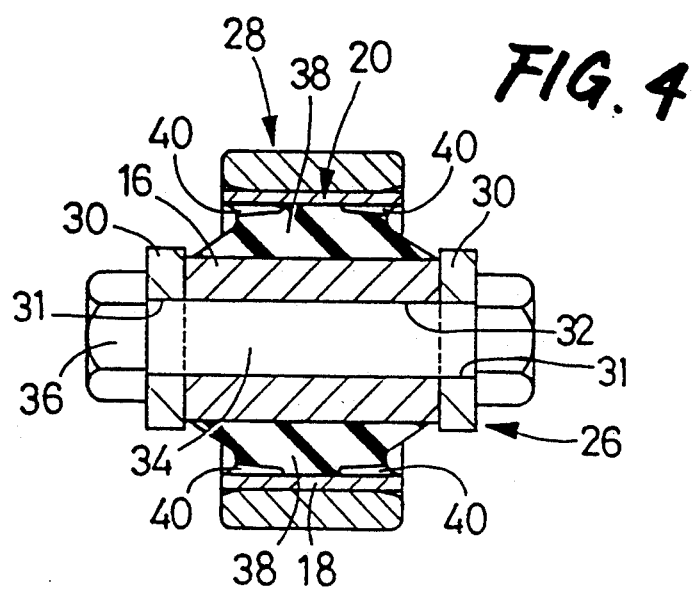

STEERING COUPLING STRUCTURE HAVING CYLINDRICAL BUSHING WITH HOLLOW PORTIONS

BACKGROUND OF THE INVENTION

1. Field of the Invention

The present invention relates to a steering coupling structure for a steering system of a motor vehicle, and more particularly to a novel steering coupling structure capable of achieving a good operating feeling of the steering system and exhibiting an excellent vibration isolating characteristic.

2. Discussion of the Prior Art

Generally, a steering system of a motor vehicle consists of a plurality of shafts and other components, for transmitting a steering effort or force (rotary power) from a steering wheel to a steering gear. In this steering system, a steering coupling structure having vibration isolating capability is interposed in the transmission line of the steering force, so as to reduce transmission of vibrations or noise received from the steering gear, road surface or suspension system, toward the steering wheel.

As one type of such a steering coupling structure, there is known one as disclosed in Publication No. 63-18837 of examined Japanese Utility Model Application, wherein an intermediate shaft for connecting a steering shaft with a steering gear box incorporates a vibration isolating rubber member. Also known is a disc type coupling structure as disclosed in Publication No. 56-35539 of examined Japanese Utility Model Application, which includes a disc-like rubber plate having mounting holes for receiving an input steering member and mounting holes for receiving an output steering member, which are alternately formed along a circle about the center axis of the rubber plate. This coupling structure further includes wires made of a suitable fibrous material, which are wound around two circumferentially adjacent ones of the above mounting holes.

The steering coupling structure as described above is required to provide sufficiently high rigidity in a torsional direction about the axis of rotation of the steering system, so as to achieve an excellent steering feeling or handling sense of the vehicle. At the same time, the coupling structure is required to exhibit a relatively soft spring characteristic in the axial direction of the steering system, so as to reduce transmission of the vibrations to the steering wheel.

However, it is extremely difficult for the known coupling structure as disclosed in the above-identified publication No. 63-18837 to have a sufficiently soft spring characteristic in the axial direction while providing sufficiently high torsional rigidity. Namely, the ratio (A/B) of the axial spring constant A(kg/mm) to the torsional rigidity B (kg·cm/deg) of this coupling structure is usually set to about 5. Thus, the known coupling structure with the intermediate shaft is incapable of achieving a good operating feeling of the steering system and excellent vibration isolating capability at the same time.

The known coupling structure as disclosed in the above-identified publication No. 56-35539 is able to provide a high degree of torsional rigidity due to the tensile strength of the wires, and a sufficiently soft spring characteristic in the axial direction due to shearing deformation of the rubber plate, assuring a good operating feeling of the steering system and excellent vibration isolating capability. In manufacturing this coupling structure, however, there are needed considerably cumbersome and complicated procedures such as winding the wires around the mounting holes and embedding the wires in the rubber plate, which eventually push up the cost of manufacture of the same.

In the known coupling structure of the above type, each of the input and output steering members of the steering system is attached to alternate ones of the mounting holes while adjacent two of the holes are surrounded by the wires. This inevitably makes the structure rather complicated and large-sized. In particular, the coupling structure of this type is difficult to be installed in recent cars which have a considerably limited space for the coupling structure owing to enlarged dwelling space and an increased number of control apparatuses, for example.

SUMMARY OF THE INVENTION

It is therefore an object of the present invention to provide a steering coupling structure which is compact in size and simple in construction, and which is capable of achieving a good steering feeling and excellent vibration isolating capability at the same time.

The above object may be attained according to the principle of the present invention, which provides a steering coupling structure including a cylindrical bushing mounted in a transmission line of a steering force in a steering system of a motor vehicle, such that an axis of the bushing extends in a direction substantially perpendicular to an axis of rotation of the steering system, the steering system including an input shaft and an output shaft, the cylindrical bushing comprising: (a) an inner sleeve connected to one of the input and output shafts of the steering system; (b) an outer sleeve disposed radially outwardly of the inner sleeve and connected to the other of the input and output shafts; and (c) an annular elastic body interposed between the input and output sleeves for elastic connection thereof, the elastic body including diametrically opposed hollow portions formed on opposite sides of the inner sleeve such that the hollow portions extend in an axial direction of the bushing between the inner and outer sleeves, the hollow portions being substantially opposed to each other in a diametric direction of the elastic body which is parallel to the axis of rotation of the steering system.

In the steering coupling structure constructed as described above, an input load and vibrations applied in the torsional and axial directions of the steering system are both transmitted through the elastic body of the cylindrical bushing. The coupling structure of the invention exhibits a relatively hard spring characteristic with respect to the input load applied in the torsional direction, owing to compressive deformation of solid portions of the elastic body which are located between the hollow portions. Upon application of vibrations in the direction of an axis of rotation of the steering system, on the other hand, the hollow portions serve to alleviate or avoid compressive and tensile deformation of the elastic body, causing mainly shearing deformation in the elastic body. Thus, the present coupling structure exhibits a sufficiently soft spring characteristic with respect to the vibrations applied in the axial direction of the steering system.

Accordingly, the steering coupling structure of the invention provides a high degree of rigidity in the torsional direction of the steering system, and a soft spring characteristic in the axial direction of the steering system, assuring a good operating feeling of the steering system and excellent vibration isolating capability.

Further, the present steering coupling structure utilizes a considerably simple cylindrical bushing having the inner and outer sleeves connected by the elastic body. Therefore, this cylindrical bushing can be easily attached to the steering system, without requiring wires or other members as used in the known coupling structures, thereby making the whole coupling structure small-sized. Thus, the present coupling structure can be produced at a low cost with high efficiency, requiring a significantly reduced space for installation thereof.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 3 is a cross sectional view taken along line 3—3 of FIG. 1; and

FIG. 4 is a cross sectional view of another embodiment of the present invention, which corresponds to that of FIG. 3.

DETAILED DESCRIPTION OF THE PREFERRED EMBODIMENT

Figure 1:
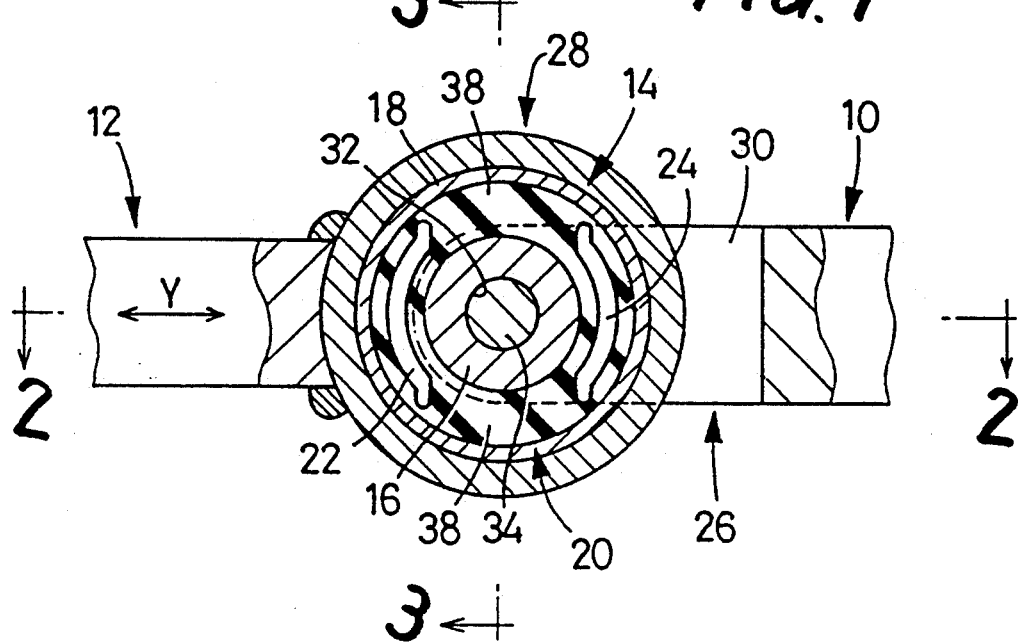
FIG. 1 is a cross sectional view showing one embodiment of a steering coupling structure of the present invention.
Figure 2:
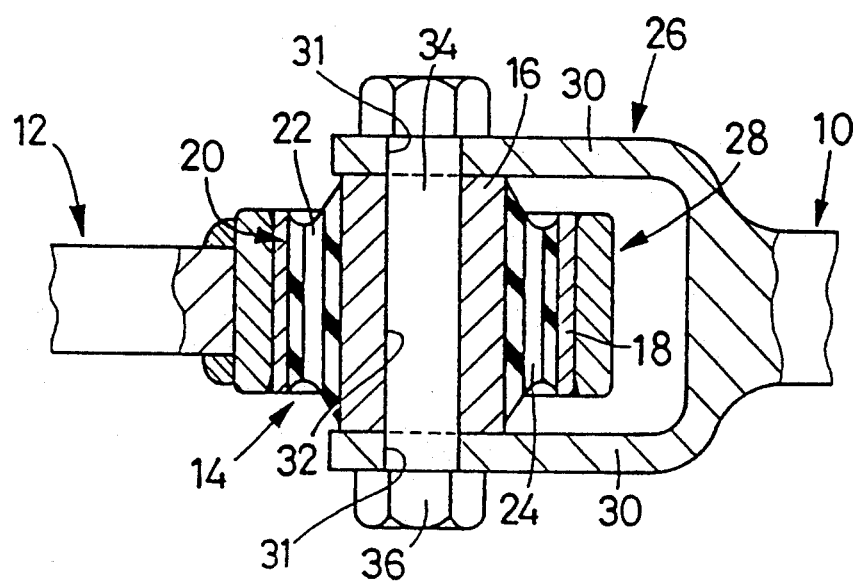
FIG. 2 is a cross sectional view taken along line 2—2 of FIG. 1.

Referring first to FIGS. 1 and 2, reference numeral 10 denotes a main shaft of a steering system of a motor vehicle, which is connected at one of its opposite ends to a steering wheel of the vehicle, and is adapted to be rotated about its axis as the steering wheel is operated.

In the same figures, reference numeral 12 denotes an intermediate shaft of the steering system, which is connected at one of its opposite ends to a gear shaft of a steering gear through an adjustable joint, for example. Through this intermediate shaft 12 is transmitted the rotary motion (or steering force) of the main shaft 10 to the steering gear, to thereby effect steering of the motor vehicle.

Between the main shaft 10 and intermediate shaft 12, there is interposed a coupling 14 having a cylindrical bushing structure, for transmitting therethrough the steering force from the main shaft 10 to the intermediate shaft 12.

The coupling 14 includes a relatively thick-walled inner sleeve 16, and an outer sleeve 18 having a larger diameter than the inner sleeve 16, as shown in FIG. 1. These inner and outer sleeves 16, 18 are disposed coaxially with each other with a predetermined radial spacing therebetween. Between the inner and outer sleeves 16, 18, there is interposed a generally cylindrical thick-walled elastic body 20 for elastically connecting these sleeves 16, 18 with each other. In this particular embodiment, the coupling 14 is produced by injecting a suitable rubber material into between the inner and outer sleeves 16, 18 which are disposed in place within a mold cavity, and filling the space between the sleeves 16, 18 with the rubber material to thereby form the elastic body 20. Thus, the coupling 14 is constructed as an integral assembly in which the inner and outer sleeves 16, 18 are bonded to the inner and outer circumferential surfaces of the elastic body 20 by means of vulcanization.

The elastic body 20 of the coupling 14 has two hollow portions in the form of axial voids 22, 24, which are formed in diametrically opposite portions of the elastic body 20 on the opposite sides of the inner sleeve 16. These axial voids 22, 24 are formed between the inner and outer sleeves 16, 18 over the entire axial length of the elastic body 20, and extend in the circumferential direction along the inner and outer sleeves 16, 18 over a given length (about one-fourth of the circumference of the elastic body 20 in this embodiment).

The main shaft 10 and intermediate shaft 12 have respective mounting portions 26, 28 formed at the other ends thereof at which these shafts 10, 12 are connected to each other through the coupling 14.

The mounting portion 26 of the main shaft 10 includes a pair of arms 30, 30 which protrude axially outwards from the end of the shaft 10, and assumes as a whole a generally U-like shape. The arms 30 are formed with respective holes 31, 31 through which a mounting bolt 34 is inserted to extend between the arms 30, 30 in a direction perpendicular to the axis of the main shaft 10. In FIGS. 2 and 3, reference numeral 36 denotes a nut which is screwed on each of axially opposite end portions of the mounting bolt 34 so as to fix the bolt 34 to the mounting portion 26 of the main shaft 10.

The mounting portion 28 of the intermediate shaft 12 consists of a thick-walled cylindrical member, which is welded at its outer circumferential surface to the end of the shaft 12 such that the axis of the portion 28 extends in a direction perpendicular to the axis of the intermediate shaft 12.

The inner sleeve 16 of the coupling 14 is fixedly attached to the main shaft 10 such that the mounting bolt 34 supported by the mounting portion 26 of the main shaft 10 is inserted through an inner bore 32 of the inner sleeve 16. On the other hand, the mounting portion 28 of the intermediate shaft 12 is press-fitted on the outer sleeve 18 of the coupling 14, so that the outer sleeve 18 is fixedly attached to the intermediate shaft 12. In this arrangement, the coupling 14 is interposed between the main shaft 10 and the intermediate shaft 12, such that the common axis of the inner and outer sleeves 16, 18 is generally orthogonal to the axis of rotation of a steering shaft which includes the main and intermediate shafts 10, 12.

With the coupling 14 thus mounted on the steering shaft 10, 12, the axial voids 22, 24 formed in the elastic body 20 are opposed to each other in the axial direction of the steering shaft 10, 12, as shown in FIG. 1. In other words, the elastic body 20 has diametrically opposite solid portions 38, 38 located between the voids 22, 24 in the circumferential direction, which portions 38, 38 are opposed to each other in a direction perpendicular to the axis of the steering shaft 10, 12.

In the steering system in which the coupling 14 is mounted on the steering shaft 10, 12 as described above, a steering force or a torsional load for rotating the main shaft 10 is applied to the inner sleeve 16, and is then transmitted to the intermediate shaft 12 through the elastic body 20 and the outer sleeve 18. This torsional steering force is applied to the coupling 14 so that the inner sleeve 16 is twisted relative to the outer sleeve 18 in a direction indicated by an arrow X in FIG. 3, thereby effectively inducing compressive and tensile deformation of the solid portions 38, 38 of the elastic body 20. Thus, the instant coupling 14 exhibits a relatively hard spring characteristic with respect to the torsional load applied from the main shaft 10.

On the other hand, a vibrational load is applied from the intermediate shaft 12 to the outer sleeve 18 mainly in the axial direction of the shaft 12. Upon application of the vibrational load in the axial direction, the outer sleeve 18 is displaced relative to the inner sleeve 16 in a direction (indicated by an arrow Y in FIG. 1) in which the axial voids 22, 24 are opposed to each other. Therefore, the axial voids 22, 24 serve to prevent occurrence of the compressive and tensile deformation of the elastic body 20. Thus, the instant coupling 14 exhibits a relatively soft spring characteristic with respect to the vibrational load applied from the intermediate shaft 12.

Accordingly, the coupling structure constructed as described above exhibits both sufficiently high rigidity with respect to the torsional load in the steering system, and a sufficiently soft spring characteristic with respect to the axial vibrational load, thereby assuring a good operating feeling of the steering system and excellent vibration isolating capability.

In the coupling structure of the instant embodiment, the ratio (A/B) of the spring constant A (kg/mm) provided in the axial direction of the steering system to the torsional rigidity B (kg·cm/deg) about the axis of rotation of the steering system can be set within a range of about 0.2 to 0.4.

Further, the instant coupling structure may be obtained by merely mounting a simple cylindrical bushing having the inner and outer sleeves 16, 18 connected by the elastic body 20, on a transmission line of the steering force in the steering system, with the bushing properly oriented with respect to the transmission line. Accordingly, the coupling structure of the invention does not require wires or other members for assuring sufficiently high rigidity in the torsional direction of the steering system. Thus, the present coupling structure is considerably simple in construction, and can be readily produced at a reduced cost, as compared with the known disc type coupling structure using such wires.

Moreover, in the instant coupling structure, the coupling 14 may be mounted on the steering system only by attaching the inner sleeve 16 and outer sleeve 18 to the main shaft 10 and intermediate shaft 12, respectively. Therefore, the present coupling structure is compact in size and requires a reduced space for installation thereof, as compared with the known disc type coupling structure using wires and having a plurality of mounting portions for attachment to steering shafts.

While the present invention has been described in its preferred embodiment, for illustrative purpose only, it is to be understood that the invention is by no means limited to the details of the illustrated embodiment, but may be otherwise embodied.

In some cases, it is desirable to set the rigidity of the coupling structure in the torsional direction of the steering system to a relatively low value so that the steering system can rotate a slight amplitude or angle about its axis, so as to isolate vibrations such as flutters. In such cases, each solid portion 38, 38 of the elastic body 20 may be advantageously formed with two notches 40, 40, as shown in FIG. 4, such that the notches 40, 40 extend a given distance from the axially opposite ends of the elastic body 20. In FIG. 4, the same reference numerals as used in the illustrated embodiment are used for identifying structurally and functionally corresponding elements, to facilitate understanding of the instant embodiment.

The inner and/or outer sleeve(s) of the coupling structure may be formed to have a rectangular or elliptic cross section, for example, such that the radial spacing between the inner and outer sleeves (i.e., thickness of the elastic body) varies in the circumferential direction. In this case, the coupling structure may exhibit different spring characteristics in the torsional and axial directions of the steering system.

It is also possible to provide a reinforcing member or the like in the solid portion of the elastic body so that the coupling structure exhibits different spring characteristics in the torsional and axial directions of the steering system.

While the axial voids (22, 24) are formed through the elastic body over its entire axial length in the illustrated embodiments, the hollow portions of the elastic body may be in the form of holes having a suitable axial length but not axially penetrating the elastic body. Alternatively, a part of the elastic body may protrude from the inner or outer sleeve into the void, so as to serve as a buffer or stopper for limiting the amount of relative displacement of the inner and outer sleeves.

In the illustrated embodiments, the inner sleeve 16 of the coupling 14 is attached to the main shaft 10 while the outer sleeve 18 is attached to the intermediate shaft 12. However, the inner sleeve 16 may be attached to the intermediate shaft 12 while the outer sleeve 18 may be attached to the main shaft 10, to provide the same effects of the present invention as provided in the illustrated embodiments.

Further, the arrangement for attaching the steering system to the inner and outer sleeves of the coupling is not limited to that of the illustrated embodiment. For example, the outer sleeve 18 may be formed integrally with a bracket for attachment of the coupling to the steering shaft.

Moreover, the steering system may be attached to the inner or outer sleeve of the coupling such that the steering system may be rotated a suitable angle relative to the coupling about the axis of the inner and outer sleeves. Thus, the coupling may serve as an adjustable joint for connecting two shafts of the steering system.

It is also to be understood that the present invention may be embodied with various other changes, modifications and improvements, which may occur to those skilled in the art, without departing from the spirit and scope of the invention defined in the following claims.

What is claimed is:

1. A steering coupling structure including a cylindrical bushing mounted in a transmission line of a steering force in a steering system of a motor vehicle, such that a longitudinal axis of said bushing extends in a direction substantially perpendicular to an axis of rotation of said steering system, said steering system including an input shaft and an output shaft, said cylindrical bushing comprising:

an inner sleeve connected to one of said input and output shafts of said steering system;

an outer sleeve disposed radially outwardly of said inner sleeve and connected to the other of said input and output shafts; and an annular elastic body interposed between said input and output sleeves for elastic connection thereof, said elastic body including diametrically opposed solid portions formed on opposite sides of said inner sleeve, said solid portions being opposed to each other in a diametric direction of the elastic body which is perpendicular to said axis of rotation of said steering system, and diametrically opposed hollow portions formed on opposite sides of said inner sleeve such that said hollow portions extend in an axial direction of the bushing between said inner and outer sleeves, said hollow portions being substantially opposed to each other in a diametric direction of the elastic body which is parallel to said axis of rotation of said steering system.

2. A steering coupling structure according to claim 1, wherein said hollow portions consist of a pair of axial voids which extend between said inner and outer sleeves over an entire axial length of said elastic body.

3. A steering coupling structure according to claim 1, wherein each of said solid portions has two notches which extend axially inwards from axially opposite ends of said elastic body.

4. A steering coupling structure according to claim 1, wherein said input shaft is connected to said inner sleeve of said cylindrical bushing while said output shaft is connected to said outer sleeve of the bushing.

5. A steering coupling structure according to claim 4, wherein said input shaft has at one axial end thereof a U-shaped mounting portion having two arms which are attached to said inner sleeve, while said output shaft has at one axial end thereof a cylindrical mounting portion which is press-fitted on said outer sleeve.

* * * * *